Nov. 14, 1967   G. E. LEIBINGER   3,353,129
HIGH VOLTAGE ELECTRIC INDUCTION APPARATUS
Filed Oct. 24, 1965   2 Sheets-Sheet 1
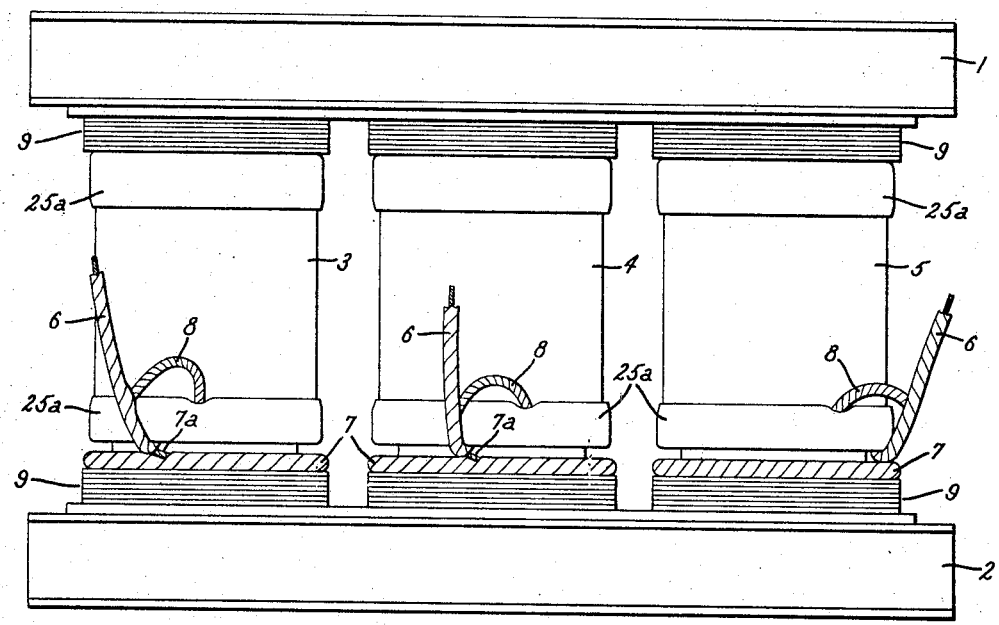
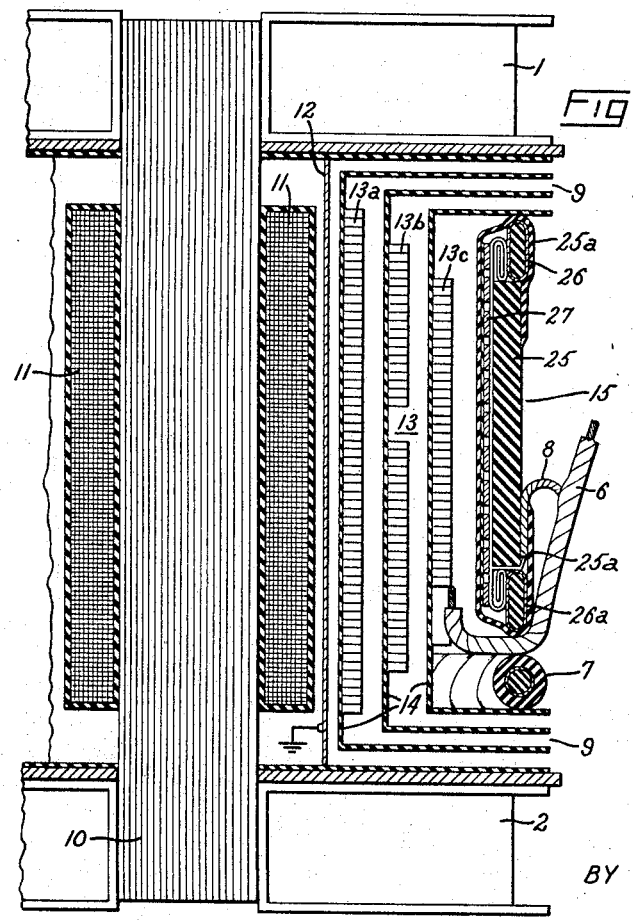
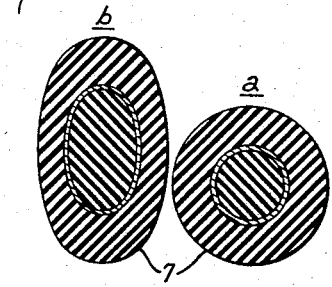
INVENTOR:
GEORGE E. LEIBINGER,
BY J Wesley Hawbuer
ATTORNEY Nov. 14, 1967   G. E. LEIBINGER   3,353,129
HIGH VOLTAGE ELECTRIC INDUCTION APPARATUS
Filed Oct. 24, 1965   2 Sheets-Sheet 2
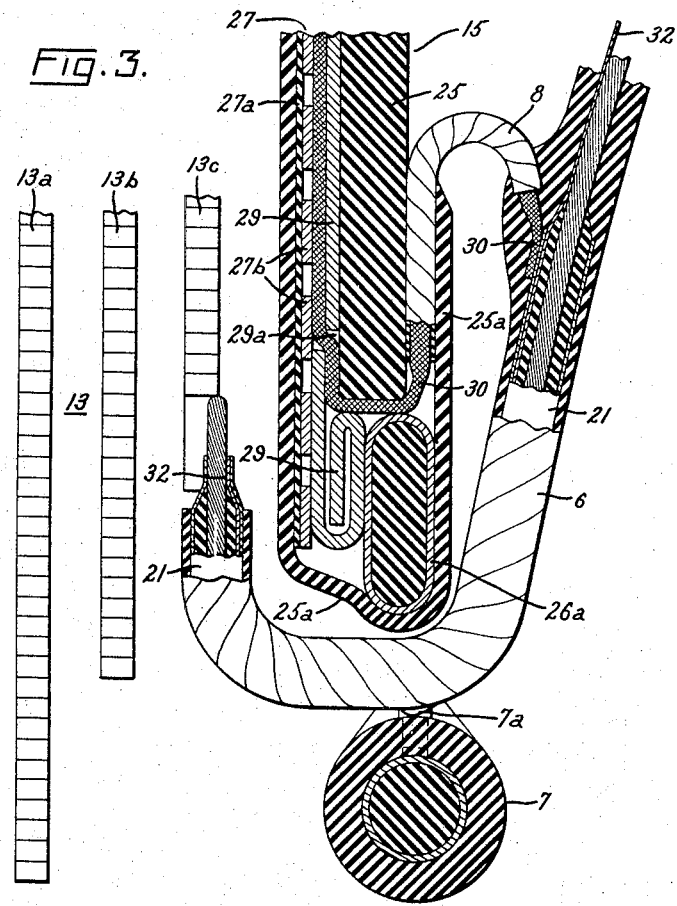
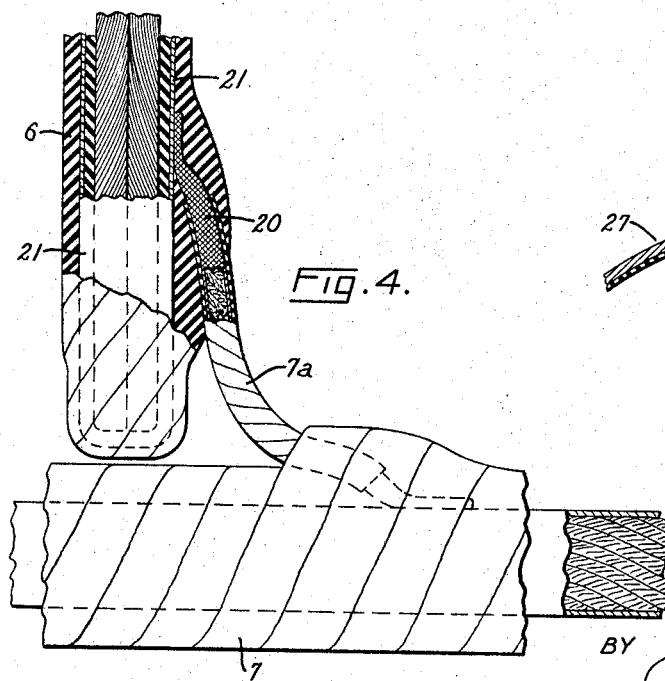
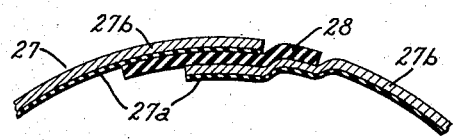
INVENTOR:
GEORGE E. LEIBINGER,
BY J. Wesley Kaulner
ATTORNEY

United States Patent Office 3,353,129
Patented Nov. 14, 1967

3,353,129
HIGH VOLTAGE ELECTRIC INDUCTION APPARATUS
George E. Leibinger, Pittsfield, Mass., assignor to General Electric Company, a corporation of New York
Filed Oct. 24, 1965, Ser. No. 504,566
9 Claims. (Cl. 336—70)

ABSTRACT OF THE DISCLOSURE

In a high voltage winding for electric induction apparatus, electrostatic stress on the incoming line lead at its point of entry into the winding is reduced by providing axially adjacent the cylindrical line shield a conductive shielding ring. The line lead is brought into the winding in the circumferential gap between the cylindrical part of the shield and the axially spaced ring.

---

My invention relates to high voltage electric induction apparatus and particularly to high potential electrostatic shields and lead-in conductors for such apparatus. The invention is especially applicable to line potential shields and associated lead-in conductors for extra high voltage power transformers and reactors designed for operation at voltages of the order of 200,000 volts and above.

In high voltage electric transformers and reactors having cylindrical layer-type windings, one end of the inner winding layer is usually connected to ground potential and one end of the outer winding layer connected to a predetermined high line potential. It is common practice to provide adjacent the inner winding layer a cylindrical metallic shield at ground potential and adjacent the outer winding layer a cylindrical metallic shield at high line potential. These shields do not carry any power current but are connected to their respective potential sources in order to control electrostatic voltage distribution under transient voltage impulse conditions. By such electrostatic shielding it is possible to ensure a potential distribution under transient conditions which has substantially the same uniformity as under normal steady-state operating conditions. By this means concentration of electrostatic stress and consequent breakdown of insulation is avoided.

High voltage cylindrical layer windings, formed as above described, typically have outer layers of shorter axial length than the inner layers in order to provide greater spacing between the grounded core and the axial ends of the high potential outer winding layers. The line potential shield extends axially beyond the extremities of the outer winding layers but is heavily insulated. The shield is commonly formed of paper covered with sheets or strips of metal foil and is provided at its ends with foil-wrapped rings, or rims, of appreciable thickness. These end rings provide a large radius of curvature at the ends of the high potential shield thereby to diminish concentration of electrostatic stress at the end points.

The ends of the line shield are usually closely adjacent a group of insulating collars which extend radially outward from the insulating cylinders between the winding layers to form oil-circulating ducts. Between the end collars and the line shield there is very little space for the entry of a high potential line lead for power connection to the outer winding layer. Such leads usually pass around the end of the line shield, and thus present a localized high spot or point in respect to the otherwise smooth circumference of the line shield rim. In addition, the line lead may carry reduced insulation at this point because of the limited space available. At this point of entry of the high potential line conductor, or power lead, the electrostatic stress from adjacent parts at different potential (such as the ground shield, the core, winding layers of different potential, grounded structural parts, etc.) is very considerable under both steady state and transient conditions, and the shielding effect of the line shield on the lead is diminished by the heavy insulation on the shield. It is thus highly desirable to provide for entry of the high voltage line lead into the winding in such a way that electrostatic stress on the lead at the point where it passes the end of the line shield is reduced in magnitude and more evenly distributed.

Accordingly it is a general object of my invention to provide an improved arrangement of electrostatic shield and incoming high voltage power conductor in high voltage electric induction apparatus.

It is another object of my invention to provide an improved high potential line shield for electric induction apparatus arranged to facilitate entry into the winding of a high potential power conductor without undue concentration of electrostatic stress at the point of entry.

In carrying out my invention in one preferred embodiment, I provide at the outer high voltage surface of a cylindrical layer-type electric coil a cylindrical high potential shield having at one end two axially spaced-apart conductive end rings of appreciable cross-sectional dimension. The proximate ring and the cylindrical shield are wrapped in a common insulating sheath, and the axially more remote ring is individually insulated. Between these insulated high potential end rings space is provided for the entry of a high potential power conductor. If desired, the rings may be in close proximity and the power conductor brought in through a notch or indentation in the insulating sheath of one or both rings. The power conductor passes around the end of the cylindrical line shield and proximate end ring and into the winding for connection to the high potential end of the outer winding layer. Adjacent the spaced-apart end rings and near its point of entry the power conductor, or line lead, is provided with a conductive tap leading to the cylindrical line shield and the integrally wrapped proximate end ring. A separate conductive tap is provided from the line lead to the separately insulated and axially more remote end ring. By thus bringing the lead into the winding through a circumferential gap in the line shield, electrical stress on the lead at its point of entry is less concentrated and of reduced magnitude, so that the amount of insulation required on the lead is reduced.

My invention will be more fully understood and its various objects and advantages further appreciated by referring now to the following detailed specification taken in conjunction with the accompanying drawing in which:

FIG. 1 is a side elevational view of a three-legged thereee-phase high voltage electric power transformer embodying my invention;

FIG. 2 is a fragmentary cross-sectional view of one transformer core leg and its associated primary and secondary transformer windings, showing a high voltage electrostatic shield and incoming line lead embodying my invention;

FIG. 3 is a fragmentary cross-sectional view of one axial end of the high voltage winding and electrostatic shield shown at FIG. 2, illustrating in greater detail the structure of the incoming line potential power lead;

FIG. 4 is a fragmentary side elevational view, partly in cross section, showing in detail the high voltage tap connection between the incoming line lead and the auxiliary line shield ring;

FIG. 5 is a fragmentary cross-sectional view showing a detail of electrostatic shield structure; and FIG. 6 illustrates a modified ring structure embodying my invention.

Referring now to the drawing, I have shown at FIG. 1 a three-phase electric transformer comprising a magnetizable core including upper and lower yoke members 1 and 2, respectively, with three parallel core legs disposed therebetween. Similar windings 3, 4 and 5 are mounted concentrically upon the respective core legs. Each winding is provided with a high voltage incoming power lead 6, and below each winding in axial spaced relation therewith is an open or split electrostatic shielding ring 7. The ring 7 is electrically connected to the line lead 6 through a tap connection 7a, and a second tap connection 8 from the line lead 6 enters the coil for connection to additional electrostatic shielding means illustrated at FIGS. 2 and 3. Above and below each of the transformer coils 3, 4 and 5 there are shown at FIG. 1 groups of spaced-apart insulating collars 9 which are also illustrated in greater detail at FIG. 2.

Referring now to FIG. 2, I have shown a fragmentary cross-sectional view of one of the transformer legs and associated coils illustrated generally at FIG. 1. As shown at FIG. 2, a transformer leg 10 of magnetizable material is surrounded by a cylindrical low voltage primary winding 11 of conventional structure, and surrounding the primary winding 11 in concentric spaced relation is disposed a cylindrical metallic shield 12 adapted to be connected to ground potential. Radially beyond the grounded electrostatic shield 12 is provided a cylindrical layer-type secondary winding 13 having several concentric layers 13a, 13b and 13c in radially spaced-apart relation. Each secondary winding layer is wound upon a separate insulating cylinder 14, and the ends of the cylinders are flanged over to provide end collars extending radially outward and constituting the groups of collars 9 previously referred to. The spaced-apart groups of insulating collars 9 along with the radially spaced insulating cylinders 14 form oil-circulating channels between the several secondary winding coil layers 13a, 13b and 13c.

The outer terminal end of the high voltage secondary winding 13 is located at one axial end of the outer winding layer 13c and is adapted to be connected to a high voltage source of electric current supply. It will be evident therefore that with one end of the inner winding layer 13a connected to ground potential and one end of the outer winding layer 13c connected to a high potential, for example of the order of 200,000 volts or above, there is appreciable potential difference between the several winding layers in normal steady-state operating conditions. Because of the progressively higher potential of the intermediate and outer winding layers 13b and 13c, these layers are made progressively shorter in axial dimension in order to space them further away from the grounded core and structural parts, such as the core yokes 1 and 2.

Radially outward beyond the winding 13, and preferably in radially spaced relation therewith, there is provided a cylindrical electrostatic shielding member designated generally by the reference numeral 15. The cylindrical shielding member 15 has approximately the same radial dimension as the shielding ring 7 and is axially spaced from the ring 7 at the lower end of the shield. The shielding member 15 and the shielding ring 7 together comprise a high potential electrostatic shielding assembly adapted to be connected to the high potential of the incoming high voltage line conductor 6. The ring 7 is heavily insulated and electrically connected to the line conductor 6 by means of the tap 7a shown at FIGS. 1 and 3 and illustrated in detail at FIG. 4.

While the ring 7 may be formed of solid electric conducting material, the necessary cross-sectional area of metallic conductor in the ring is small because the ring serves only as an electrostatic shield and not as a current conducting part of any power circuit. In order to minimize concentrations of electrostatic stress, however, it is desirable that the radius of curvature of the cross section of ring 7 be large relative to the necessary cross-sectional area of conducting material in the ring. It is preferable therefore to form the ring 7 as a thin sheath or coating of metal or metal foil surrounding an annular core of rope or other electric insulating material as shown at FIGS. 2, 3 and 4. For the same reason the conducting tap connection 7a between the line lead 6 and the shielding ring 7 is also formed as a sheath of conducting material about a central insulating core. This is illustrated at FIG. 4 where the tap connection 7a is shown as a flexible sheath of braided metal 20 drawn over a central insulating core which may for example be hemp rope. The metal braid 20 in the tap 7a is in contact at one end with the metallic surface of the ring 7, and at the other end with a metallic sheath 21 surrounding and electrically connected to the line lead 6 in a manner which will be more fully described hereinafter.

The cylindrical electrostatic shielding member 15 is built upon a cylinder 25 of insulating material and comprises a pair of shielding rings 26 and 26a at axially opposite ends of the cylinder 25 and an inner cylindrical conducting layer 27 on the inner surface of the cylinder 25. All these parts are wrapped in a common insulating sheath 25a separate from the remote shielding ring 7. The conducting layer 27 is shown in detail at FIGS. 2, 3 and 5, and will be seen to comprise a paper cylinder 27a having affixed to its outer side a plurality of annular metallic strips 27b. Where the conducting strips overlap, the paper insulation between them is supplemented by a longitudinal insulating strip 28 (FIG. 5). This ensures that closed loop conductors are not formed by electrical breakdown between the overlapping ends of any strip 27b. The shielding rings 26, 26a and 7 are similarly split and their ends insulated to preclude formation of a short-circuited turn around the transformer core.

As indicated at FIGS. 2 and 3, the annular strips of metallic foil 27b are electrically connected together and to the end rings 26 and 26a by means of a longitudinal metallic contact strip 29 slotted at the point 29a for a purpose which will be more fully described hereinafter. As may be best observed at FIG. 3, the contact strip 29 extends lengthwise along the inner surface of the insulating cylinder 25 and electrically connects together the annular strips of metal foil 27b. The ends of the contact strip 29 are folded over and brought into engagement with the shielding rings 26 and 26a as may be observed at FIGS. 2 and 3. The shielding rings 26 and 26a are of construction similar to that of the ring 7 in that each is formed as an annulus of insulating material having an appreciable cross-sectional area and covered on its outer surface with a metal coating such as a wrapping of metal foil. These rings 26, 26a thus constitute radially enlarged rims at opposite ends of the foil cylinder 27.

All the metal parts in the shielding assembly 15 are further connected together and electrically connected to the high potential conductor 6 by means of the tap connector 8. As shown at FIG. 3, the tap connector 8 comprises a sheath 30 of braided metal drawn over an insulating core (not shown) which may, for example, be hemp rope, and the whole is covered with insulating tape. At its ends the braided metal 30 is extended beyond the rope core, and one of these ends extends around the lower end of the insulating cylinder 25, through the slot 29a in the contact strip 29 and upward along its length in contact with both the contact strip 29 and the annular metal foil rings 27b. At its other end the metal braid 30 of the tap connector 8 is in contact with the metallic sheath 21 surrounding the line conductor 6. As previously stated, the metallic sheath 21 is electrically connected to the line conductor. Such connection cannot conveniently be made at the point where the metal sheath 21 terminates because the line conductor is usually coated with varnish or other resinous insulating material. At FIG. 3 I have shown a strip of metal foil 32 connected to the metal sheath 21 and extending upwardly along the conductor 6 for common connection with the conductor to a high voltage line terminal (not shown).

It will be observed from FIGS. 2 and 3 that the entire line shield assembly consisting of the cylindrical shielding member 15 (including the end rings 26 and 26a)

and the separate shield ring 7 extends in an axial direction beyond the outermost winding layer at both its ends. At the lower end, however, the cylindrical shielding member 15 is foreshortened to provide space for the axially spaced-apart separate shielding ring 7. The line lead 6 is brought into the coil between the spaced-apart shielding rings 26a and 7, and space is provided between these rings to wrap the conductor 6 in adequately heavy outer insulation throughout its full length. Because of its location between adjacent shielding parts all at equal potential, and because of its heavy insulation the line conductor 6 is thus well protected against electrostatic stress and concentrations of stress which might cause breakdown of the insulation if the conductor were brought into the coil around the extreme end of the line shield as has heretofore been the practice.

At FIG. 6 I have shown a modified form of shielding ring 7 shaped to reduce the axial spacing between the ring 7 and the cylindrical shielding member 15 while still allowing adequate space for entry of the line lead 6 therebetween. In the embodiment of FIG. 6 this is done by notching the ring 7 at that point on its periphery where the line lead crosses the ring. To form such a notch without reducing the external insulation over the conductive ring 7, the cross section of the insulating core is reduced at the point of entry. As indicated at FIGS. 6a and 6b, this may be done by making the insulating core circular in cross section at that point on its periphery where the line lead enters (FIG. 6a) and generally elliptical in cross section at all other points (FIG. 6b), the long axis of the ellipse being parallel to the axis of the cylindrical member 15. With the ring 7 so notched, it may be placed so close to the ring 26a that the insulating sheaths are in engagement except at the notch. By such close spacing of the conducting parts, the shielding effect of the entire line shield assembly is improved and its usefulness at especially high voltages enhanced.

While I have described only a preferred embodiment of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States is:

1. An electric induction apparatus comprising:
    (a) a cylindrical current conducting winding adapted to be connected at one outer axial end thereof to a high voltage source of electric current supply,
    (b) a substantially cylindrical electrostatic shielding assembly of electrically conductive material surrounding said winding,
    (c) said shielding assembly comprising a cylindrical portion extending axially along said winding and a pair of juxtaposed end rings of substantially equal diameter axially spaced apart adjacent one end of said cylindrical portion,
    (d) insulating means enclosing said cylindrical portion and the proximate end ring in a common sheath,
    (e) separate insulating means enclosing the other said end ring,
    (f) an insulated high voltage line conductor extending between said end rings and electrically connected to the proximate outer end of said winding, and
    (g) conductive tap connections from said line conductor to said end rings and said cylindrical shielding portion.

2. An electric induction apparatus comprising:
    (a) a cylindrical current-conducting winding adapted to be connected at one outer axial end thereof to a high voltage source of electric current supply,
    (b) a thin cylindrical metallic shielding member surrounding said winding and having one end in juxtaposition to said one end of said winding,
    (c) a pair of axially spaced-apart metallic shielding rings thicker in cross section than said cylindrical shielding member and substantially equal in diameter thereto positioned adjacent said one end of said cylindrical member,
    (d) insulating means forming a common sheath enclosing said cylindrical shielding member and the proximate shielding ring, said cylindrical shielding member and proximate ring being electrically connected together within said common sheath,
    (e) separate insulating means enclosing the other said shielding ring,
    (f) an insulated high voltage line conductor having an end portion extending between said shielding rings and electrically connected to the proximate end of said winding,
    (g) said end portion of said line conductor including a tubular metal sheath embedded in the insulation of said conductor in radial spaced relation with and electrically connected to said conductor, and
    (h) separate conductor tap connections from said tubular metal sheath to said shielding rings.

3. An electric induction apparatus according to claim 2 wherein each said shielding ring is formed as thin metallic coating over an annular insulating core large in cross section relative to the cross-sectional area of the coating.

4. An electric induction apparatus according to claim 2 wherein said conductive tap connections are formed as tubular metal sheaths over elongated insulating cores.

5. An electric induction apparatus according to claim 1 wherein said winding comprises a plurality of helically wound cylndrical layers of continuous conductor.

6. An electric induction apparatus according to claim 1 in which said winding comprises a plurality of cylindrical layers of helically wound conductor with each layer progressively shorter in axial length than the preceding layer in proceeding from the radially inner low voltage end of said winding toward the outer high voltage end.

7. An electric induction apparatus comprising:
    (a) a cylindrical current conducting winding adapted to be connected at one outer axial end to a high voltage source of electric current supply,
    (b) an electrostatic shield surrounding said winding for substantially its full axial length and including a split conductive cylinder and a split conductive ring of substantially equal diameter in axially spaced relation, said ring being adjacent said one outer axial end of said winding,
    (c) an insulated high voltage line conductor connected to said one end of said winding and extending between said ring and said cylinder, and
    (d) electrically conductive tap connections from said line conductor to said ring and cylinder.

8. An electric induction apparatus according to claim 7 in which said conductive cylinder comprises a body of thin metal foil and radially enlarged end rims of conducting material enclosed in a common insulating sheath.

9. An electric induction apparatus according to claim 8 in which said winding comprises a plurality of helically wound layers of continuous conductor.

References Cited

UNITED STATES PATENTS

| | | | |
|---|---|---|---|
| 1,585,448 | 5/1926 | Weed | 336—70 |
| 2,279,027 | 4/1942 | Weed et al. | 336—70 |
| 2,536,003 | 12/1950 | Dupre | 174—75 X |
| 2,723,933 | 11/1955 | Isenbenberg | 336—185 X |
| 2,724,735 | 11/1955 | Johnston | 336—84 X |
| 2,987,684 | 6/1961 | Doucette | 336—185 X |
| 3,028,568 | 4/1962 | Camilli | 336—84 X |
| 3,183,462 | 5/1965 | Brown | 336—84 |

LEWIS H. MYERS, *Primary Examiner.*

T. J. KOZMA, *Assistant Examiner.*